United States Patent
Hessburg et al.

(10) Patent No.: US 7,680,688 B2
(45) Date of Patent: Mar. 16, 2010

(54) SYSTEM AND METHOD FOR EXCHANGING LOYALTY POINTS FOR ACQUISITIONS

(75) Inventors: Matthew Benedict Hessburg, Jersey City, NJ (US); Andrew W. Rappleyea, Kernersville, NC (US); Sunen Rodriguez, Weehawken, NJ (US); Julie Sanoff, Hoboken, NJ (US); Andrea N. Silverstein, Princeton, NJ (US)

(73) Assignee: American Express Travel Related Services Company, Inc., New York, NY (US)

( * ) Notice: Subject to any disclaimer, the term of this patent is extended or adjusted under 35 U.S.C. 154(b) by 703 days.

(21) Appl. No.: 10/260,829

(22) Filed: Sep. 30, 2002

(65) Prior Publication Data

US 2003/0225618 A1 Dec. 4, 2003

Related U.S. Application Data

(60) Provisional application No. 60/384,010, filed on May 28, 2002.

(51) Int. Cl.
*G06Q 30/00* (2006.01)

(52) U.S. Cl. .................. 705/14.33; 705/14.38; 705/26; 705/14.37

(58) Field of Classification Search .................. 705/14, 705/26, 67, 77, 42, 14.23, 14.27, 14.28, 14.33, 705/14.37, 14.38, 28, 37; 235/375, 376, 235/380, 381, 383; 709/203, 218, 223, 227, 709/228
See application file for complete search history.

(56) References Cited

U.S. PATENT DOCUMENTS

| | | | |
|---|---|---|---|
| 5,025,372 A | 6/1991 | Burton et al. | |
| 5,644,727 A * | 7/1997 | Atkins | 705/40 |
| 5,689,100 A * | 11/1997 | Carrithers et al. | 235/380 |
| 5,734,838 A | 3/1998 | Robinson et al. | |
| 5,744,870 A * | 4/1998 | Casper | 257/786 |
| 5,774,870 A * | 6/1998 | Storey | 705/14 |
| 5,915,244 A | 6/1999 | Jack et al. | |
| 5,923,016 A * | 7/1999 | Fredregill et al. | 235/380 |
| 5,937,391 A | 8/1999 | Ikeda et al. | |
| 5,963,916 A * | 10/1999 | Kaplan | 705/26 |
| 5,965,695 A * | 10/1999 | Simon et al. | 530/324 |
| 5,973,391 A * | 10/1999 | Bischoff et al. | 257/678 |
| 6,003,013 A | 12/1999 | Boushy et al. | |
| 6,009,411 A | 12/1999 | Kepecs | |
| 6,009,412 A * | 12/1999 | Storey | 705/14 |
| 6,009,415 A | 12/1999 | Shurling et al. | |
| 6,012,050 A | 1/2000 | Eaton et al. | |
| 6,015,344 A * | 1/2000 | Kelly et al. | 463/16 |

(Continued)

Primary Examiner—Andrew Joseph Rudy
(74) Attorney, Agent, or Firm—Snell & Wilmer L.L.P.

(57) ABSTRACT

Systems and methods are provided for facilitating an acquisition from a merchant, whereby payment for the acquisition is made at least partially through automated redemption of loyalty points from a loyalty account. In particular, information is received at a loyalty point exchange system from the merchant. The information may include loyalty data indicating that the acquisition was paid for using a transaction card account that is to be reimbursed using loyalty points from the loyalty account. The loyalty account is debited by an amount equal to a currency value of the acquisition and the transaction card account is credited the amount charged for the acquisition. Loyalty points may, alternatively, be used to directly pay for purchases without the steps of charging and crediting a transaction card.

8 Claims, 4 Drawing Sheets

U.S. PATENT DOCUMENTS

| | | | |
|---|---|---|---|
| 6,018,718 | A | 1/2000 | Walker et al. |
| 6,067,532 | A | 5/2000 | Gebb |
| 6,070,147 | A * | 5/2000 | Harms et al. .................. 705/14 |
| 6,073,840 | A | 6/2000 | Marion |
| 6,076,101 | A * | 6/2000 | Kamakura et al. .......... 709/206 |
| 6,116,505 | A | 9/2000 | Withrow |
| 6,119,933 | A | 9/2000 | Wong et al. |
| 6,128,599 | A | 10/2000 | Walker et al. |
| 6,138,911 | A | 10/2000 | Fredregill et al. |
| 6,178,408 | B1 | 1/2001 | Copple et al. |
| 6,189,787 | B1 | 2/2001 | Dorf |
| 6,195,644 | B1 | 2/2001 | Bowie |
| 6,205,435 | B1 | 3/2001 | Biffar |
| 6,222,914 | B1 | 4/2001 | McMullin |
| 6,266,647 | B1 | 7/2001 | Fernandez |
| 6,308,887 | B1 * | 10/2001 | Korman et al. ............... 235/379 |
| 6,327,573 | B1 * | 12/2001 | Walker et al. ................. 705/14 |
| 6,330,543 | B1 | 12/2001 | Kepecs |
| 6,339,765 | B1 * | 1/2002 | Maher ......................... 705/41 |
| 6,345,261 | B1 | 2/2002 | Feidelson et al. |
| 6,378,075 | B1 | 4/2002 | Goldstein et al. |
| 6,409,080 | B2 * | 6/2002 | Kawagishi .................. 235/375 |
| 6,450,407 | B1 * | 9/2002 | Freeman et al. ............. 235/492 |
| 6,497,360 | B1 * | 12/2002 | Schulze, Jr. ................. 235/381 |
| 6,549,912 | B1 * | 4/2003 | Chen ....................... 707/104.1 |
| 6,594,640 | B1 | 7/2003 | Postrel |
| 6,634,549 | B1 * | 10/2003 | Matsumoto et al. ......... 235/379 |
| 6,736,322 | B2 | 5/2004 | Gobburu et al. |
| 6,808,111 | B2 * | 10/2004 | Kashef et al. ............... 235/380 |
| 6,820,061 | B2 | 11/2004 | Postrel |
| 6,829,586 | B2 | 12/2004 | Postrel |
| 6,837,436 | B2 * | 1/2005 | Swartz et al. .......... 235/472.02 |
| 6,842,739 | B2 * | 1/2005 | Postrel ........................ 705/14 |
| 6,889,198 | B2 * | 5/2005 | Kawan ......................... 705/14 |
| 6,947,898 | B2 * | 9/2005 | Postrel ........................ 705/14 |
| 6,965,869 | B1 * | 11/2005 | Tomita et al. ................. 705/14 |
| 6,978,250 | B1 * | 12/2005 | Kawan et al. ................. 705/14 |
| 7,021,535 | B2 * | 4/2006 | Overhultz et al. ........... 235/382 |
| 7,025,674 | B2 * | 4/2006 | Adams et al. .................. 463/1 |
| 7,027,890 | B2 * | 4/2006 | Wilson ....................... 700/232 |
| 7,028,897 | B2 * | 4/2006 | Fernandes et al. ........... 235/449 |
| 7,096,190 | B2 | 8/2006 | Postrel |
| 7,120,591 | B1 * | 10/2006 | Solomon et al. ............... 705/14 |
| 7,134,087 | B2 * | 11/2006 | Bushold et al. ............. 715/764 |
| 7,195,157 | B2 * | 3/2007 | Swartz et al. ............... 235/383 |
| 7,200,578 | B2 * | 4/2007 | Paltenghe et al. ............ 705/74 |
| 7,209,733 | B2 * | 4/2007 | Ortiz et al. ................ 455/414.1 |
| 7,243,320 | B2 * | 7/2007 | Chiu et al. ...................... 716/4 |
| 7,262,507 | B2 | 8/2007 | Hino et al. |
| 7,289,970 | B1 | 10/2007 | Siegel |
| 7,295,992 | B2 * | 11/2007 | Villaret et al. ................. 705/16 |
| 7,367,501 | B2 | 5/2008 | Bortolin et al. |
| 7,374,078 | B2 | 5/2008 | Spaeth et al. |
| 7,395,231 | B2 * | 7/2008 | Steury et al. ................... 705/34 |
| 7,398,318 | B2 | 7/2008 | McIntyre |
| 7,424,441 | B2 | 9/2008 | George et al. |
| 7,424,617 | B2 * | 9/2008 | Boyd et al. .................. 713/176 |
| 7,430,528 | B2 * | 9/2008 | Perkowski ................... 705/27 |
| 7,496,542 | B2 * | 2/2009 | Hibler et al. .................. 705/67 |
| 2001/0018660 | A1 | 8/2001 | Sehr |
| 2002/0174013 | A1 * | 11/2002 | Freeman et al. ............... 705/14 |
| 2003/0078864 | A1 * | 4/2003 | Hardesty et al. ............. 705/35 |
| 2003/0140306 | A1 * | 7/2003 | Robinson ................... 715/500 |
| 2003/0216960 | A1 | 11/2003 | Postrel |
| 2004/0039644 | A1 | 2/2004 | Postrel |
| 2004/0097287 | A1 | 5/2004 | Postrel |
| 2004/0098317 | A1 | 5/2004 | Postrel |
| 2004/0107140 | A1 | 6/2004 | Postrel |
| 2004/0220854 | A1 | 11/2004 | Postrel |
| 2005/0021399 | A1 | 1/2005 | Postrel |
| 2005/0021400 | A1 | 1/2005 | Postrel |
| 2005/0021401 | A1 | 1/2005 | Postrel |
| 2005/0060225 | A1 | 3/2005 | Postrel |
| 2005/0080727 | A1 | 4/2005 | Postrel |
| 2005/0149394 | A1 | 7/2005 | Postrel |
| 2005/0240472 | A1 | 10/2005 | Postrel |
| 2006/0020511 | A1 | 1/2006 | Postrel |

* cited by examiner

300 cont.

SYSTEM AND METHOD FOR EXCHANGING LOYALTY POINTS FOR ACQUISITIONS

CROSS-REFERENCE TO RELATED APPLICATIONS

This application claims priority to, and the benefit of, U.S. Provisional Application Ser. No. 60/384,010, entitled "SYSTEM AND METHOD FOR EXCHANGING LOYALTY POINTS FOR TICKETS," filed May 28, 2002, which is incorporated herein by reference.

FIELD OF INVENTION

The present invention generally relates to loyalty systems, and more particularly, to systems and methods for utilizing loyalty points for reimbursing a charge for an acquisition.

BACKGROUND OF THE INVENTION

Loyalty programs (also known as incentive or reward programs) are typically very popular in many types of businesses. For example, loyalty programs may be implemented to increase the use of a product by a current customer or to obtain additional customers. With regard to transaction cards, such as charge cards, loyalty programs may encourage a loyalty program participant to use a particular transaction card for making acquisitions. Typically, loyalty points accrue in a loyalty account and are earned from transactions that involve participant behavior that is encouraged by the loyalty program sponsor. These loyalty points may be redeemed for prizes, upgrades, and merchandise, thus rewarding the participant for the behavior. However, prior art loyalty point redemption processes lack "real-time" use by the participant. For instance, in a typical redemption process, a participant calls the loyalty system and requests to redeem a number of loyalty points in exchange for a certificate that can be used at a particular merchant (on-line or off-line). The participant is mailed a certificate (or provided with an online code) and then can redeem the certificate at that merchant.

This typical redemption process is time-consuming and may be annoying for the consumer, thus degrading the value of the loyalty reward. Furthermore, this redemption process is generally not practical for the acquisition of goods and services that are in high demand and/or that have short selling periods. For example, difficulties may be encountered when a participant desires to redeem loyalty points for tickets to a particular concert. By the time the participant requests a certificate, receives the requested certificate, and contacts the ticket agency to redeem the certificate, desired tickets to the particular concert may no longer be available. This participant may have only wanted to redeem the loyalty points for that one particular concert. Furthermore, in this example, the participant may now be left holding a certificate that is inappropriate for other ticket purchases. For example, the certificate value may not match the price of a later selected ticket, or the certificate may be restricted to a particular ticket agency. Furthermore, the participant risks misplacing the certificate before the next redemption opportunity.

Prior art systems may also offer the ability for members of loyalty programs to telephone the ticketing agency for a special offer (i.e. discount, or free gift) through the input of an offer code into the telephone system. The member may obtain a discount or gift with the ticket purchase when tickets are received in the mail. These "one-off" promotions are typically determined by the producers/owners of the actual event who are the ticketing agency's clients. However, efficient use of rewards points as a payment option through a ticketing agency or on an exchange does not exist. In general, the ability to efficiently acquire goods or services with loyalty points without pre-approval does not exist. Therefore, a system is needed to facilitate an expedited method for purchasing "available" tickets with loyalty points.

SUMMARY OF THE INVENTION

Systems and methods are provided for facilitating an acquisition from a merchant, whereby payment for the acquisition is made at least partially through automated redemption of loyalty points from at least one loyalty account. In particular, information is received at a loyalty point exchange system from the merchant. The information may include loyalty data indicating that the acquisition was at least partially paid for using a transaction card account that is to be at least partially reimbursed using loyalty points from the loyalty account. The loyalty account is debited by an amount equal to a currency value of the acquisition and the transaction card account is credited the amount charged for the acquisition. In accordance with another exemplary embodiment of the present invention, loyalty points may be used to directly pay for purchases without the steps of charging and crediting a transaction card.

BRIEF DESCRIPTION OF THE DRAWINGS

A more complete understanding of the present invention may be derived by referring to the detailed description and claims when considered in connection with the Figures, wherein like reference numbers refer to similar elements throughout the Figures, and:

DETAILED DESCRIPTION OF EXEMPLARY EMBODIMENTS OF THE INVENTION

Figure 1:
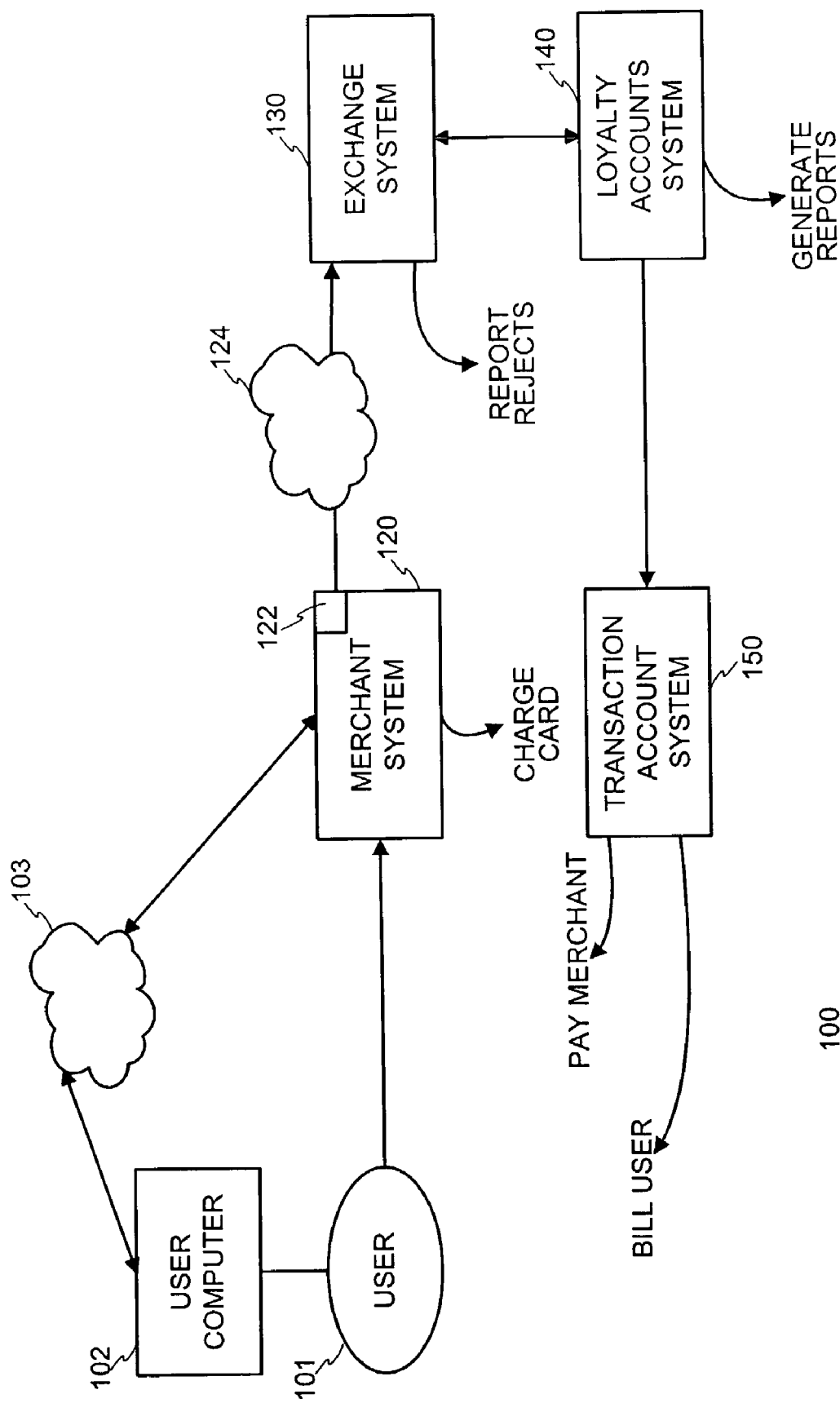
FIG. 1 illustrates a block diagram overview of an exemplary loyalty point exchange system in accordance with an exemplary embodiment of the present invention.

While the exemplary embodiments herein are described in sufficient detail to enable those skilled in the art to practice the invention, it should be understood that other embodiments may be realized and that logical and mechanical changes may be made without departing from the spirit and scope of the invention. Thus, the following detailed description is presented for purposes of illustration only and not of limitation.

In general, a user communicates with a merchant, indicates a desire to acquire a product, and chooses to pay for the acquisition with loyalty points. As used herein, an acquisition includes the purchase, rental, lease, and/or the taking custody of goods or services. During the process of paying the merchant for the acquisition, the user may be prompted as to the possibility of using loyalty points as the method of payment and the user may also be presented with terms and/or conditions. Initially, a transaction card account may be charged for the acquisition; however, a loyalty account is subsequently debited and the transaction card account is credited. Requests to exchange loyalty points that fail to qualify may result in all or part of the charge remaining on the transaction card account. In another exemplary embodiment of the present invention, the charging and crediting of the transaction card may be omitted and the merchant may be paid directly using loyalty points.

As used herein, the terms "user", "end user", "consumer", "customer" or "participant" may be used interchangeably with each other, and each shall mean any person, entity, machine, hardware, software or business. Furthermore, the terms "ticketing agency", "business" or "merchant" may be used interchangeably with each other and shall mean any person, entity, machine, hardware, software or business.

A loyalty program may include one or more loyalty accounts. Exemplary loyalty programs include frequent flyer miles, on-line points earned from viewing or purchasing products or websites on-line and programs associated with diner's cards, credit cards, debit cards, hotel cards, and/or the like. Generally, the user is both the owner of the transaction card account and the participant in the loyalty program; however, this association is not necessary. For example, a participant in a loyalty program may gift loyalty points to a user who pays for a purchase with his own transaction account, but uses the gifted loyalty points instead of paying the monetary value.

Furthermore, a "code", "account number", "identifier" or "loyalty number", as used herein, includes any device, code, or other identifier/indicia suitably configured to allow the consumer to interact or communicate with the system, such as, for example, authorization/access code, personal identification number (PIN), Internet code, other identification code, and/or the like which is optionally located on a rewards card, charge card, credit card, debit card, prepaid card, telephone card, smart card, magnetic stripe card, bar code card, radio frequency card and/or the like. The account number may be distributed and stored in any form of plastic, electronic, magnetic, radio frequency, audio and/or optical device capable of transmitting or downloading data from itself to a second device. A customer account number may be, for example, a sixteen-digit credit card number, although each credit provider has its own numbering system, such as the fifteen-digit numbering system used by an exemplary loyalty system. Each company's credit card numbers comply with that company's standardized format such that the company using a sixteen-digit format may generally use four spaced sets of numbers, as represented by the number "0000 0000 0000 0000". The first five to seven digits are reserved for processing purposes and identify the issuing bank, card type and etc. In this example, the last sixteenth digit is used as a sum check for the sixteen-digit number. The intermediary eight-to-ten digits are used to uniquely identify the customer. In addition, loyalty account numbers of various types may be used.

For more information on loyalty systems, transaction systems, and electronic commerce systems, see, for example, U.S. patent application Ser. No. 09/836,213, filed on Apr. 17, 2001 by inventors Voltmer, et al. and entitled System And Method For Networked Loyalty Program; U.S. Continuation-In-Part patent application Ser. No. 10/027,984, filed on Dec. 20, 2001 by inventors Ariff, et al. and entitled System And Method For Networked Loyalty Program; U.S. Continuation-In-Part patent application Ser. No. 10/010,947, filed on Nov. 6, 2001 by inventors Haines, et al. and entitled System And Method For Networked Loyalty Program; U.S. Continuation-In-Part patent application Ser. No. 10/084,744, filed on Feb. 26, 2002 by inventors Bishop, et al. and entitled System And Method For Securing Data Through A PDA Portal; the Shop AMEX™ system as disclosed in Ser. No. 60/230,190, filed Sep. 5, 2000; the Loyalty As Currency™ and Loyalty Rewards Systems disclosed in Ser. No. 60/197,296 filed on Apr. 14, 2000, Ser. No. 60/200,492 filed Apr. 28, 2000, Ser. No. 60/201,114 filed May 2, 2000; a digital wallet system disclosed in U.S. Ser. No. 09/652,899 filed Aug. 31, 2000; a stored value card as disclosed in Ser. No. 09/241,188 filed on Feb. 1, 1999; a system for facilitating transactions using secondary transaction numbers disclosed in Ser. No. 09/800,461 filed on Mar. 7, 2001, and also in related provisional application Ser. No. 60/187,620 filed Mar. 7, 2000, Ser. No. 60/200,625 filed Apr. 28, 2000 and Ser. No. 60/213,323 filed May 22, 2000, all of which are herein incorporated by reference. Other examples of an online loyalty systems are disclosed in Netcentives U.S. Pat. No. 5,774,870, issued on Jun. 30, 1998, and U.S. Pat. No. 6,009,412, issued on Dec. 29, 1999, both of which are hereby incorporated by reference.

With reference now to FIG. 1, in one embodiment, a loyalty point exchange system ("loyalty system") 100 comprises a merchant system 120, an exchange system 130, a loyalty accounts system 140, and a transaction account system 150. The systems and/or components of the systems discussed herein may include a host server or other computing systems including a processor for processing digital data, a memory coupled to said processor for storing digital data, an input digitizer coupled to the processor for inputting digital data, an application program stored in said memory and accessible by said processor for directing processing of digital data by said processor, a display coupled to the processor and memory for displaying information derived from digital data processed by said processor and a plurality of databases, the databases including client data, merchant data, financial institution data and/or like data that could be used in association with the present invention. As those skilled in the art may appreciate, the user computer may typically include an operating system (e.g., Windows NT, 95/98/2000, Linux, Solaris, etc.) as well as various conventional support software and drivers typically associated with computers. The user computer can be in a home or business environment with access to a network. In an exemplary embodiment, access is through the Internet through a commercially-available web-browser software package.

A database may be any type of database, such as relational, hierarchical, object-oriented, and/or the like. Common database products that may be used to implement the databases include DB2 by IBM (White Plains, N.Y.), any of the database products available from Oracle Corporation (Redwood Shores, Calif.), Microsoft Access or MSSQL by Microsoft Corporation (Redmond, Wash.), or any other database product. A database may be organized in any suitable manner, including as data tables or lookup tables. Association of certain data may be accomplished through any data association technique known and/or practiced in the art. For example, the association may be accomplished either manually or automatically. Automatic association techniques may include, for example, a database search, a database merge, GREP, AGREP, SQL, and/or the like. The association step may be accomplished by a database merge function, for example, using a "key field" in each of the manufacturer and retailer data tables. A "key field" partitions the database according to the high-level class of objects defined by the key field. For example, a certain class may be designated as a key field in both the first data table and the second data table, and the two data tables may then be merged on the basis of the class data in the key field. In this embodiment, the data corresponding to the key field in each of the merged data tables is preferably the same. However, data tables having similar, though not identical, data in the key fields may also be merged by using AGREP, for example.

In general, merchant system 120 is configured to interact with a user 101 making an acquisition and to communicate loyalty data to exchange system 130. Exchange system 130 is configured to interact with loyalty accounts system 140 to verify qualification for loyalty point exchanges and to cause loyalty accounts system 140 to debit at least one loyalty account. Loyalty accounts system 140 may be configured to communicate with and cause transaction account system 150 to credit a transaction card account. Transaction account system 150 may also be configured to generate bills to user 101 (showing charges and/or credits as applicable) and/or to pay the merchant for acquisitions charged to the transaction card account.

Merchant system 120 may be operated, controlled and/or facilitated by any merchant that accepts payment via a transaction card for an acquisition. The merchant may be any person, entity, software and/or hardware that is a provider, broker and/or any other entity in the distribution chain of goods or services. For example, the merchant may be a ticket/event agency (e.g., Ticketmaster, Telecharge, Clear Channel, brokers, agents). In this embodiment, by integrating loyalty redemption capability with ticket ordering, users can have real-time or substantially real-time access to "available" tickets and then choose to pay for that purchase with loyalty points. While the invention may be discussed herein with respect to the purchase of tickets, any products or services may be purchased with loyalty points in accordance various aspects of the present invention. In one exemplary embodiment, purchases with loyalty points may be made in accordance with, U.S. patent application Ser. No. 09/834,478, filed Apr. 13, 2001, entitled "System and Method for Using Loyalty Points", which is incorporated herein by reference. In an alternative embodiment, the tickets to be purchased may be on the secondary market (e.g., previously purchased tickets) in accordance with, U.S. Pat. No. 6,067,532, issued May 23, 2000, entitled "Ticket Redistribution System", which is incorporated herein by reference.

Merchant system 120 is configured to facilitate interaction with user 101 which may be any person, entity, software and/or hardware. The user may communicate with the merchant in person (e.g., at the box office), via telephone (e.g., interactive voice response or "live" customer service representatives), or electronically (e.g., from a user computer 102 via internet 103). During the interaction, the merchant may offer goods and/or services to the user. The merchant may also offer the user the option of paying for the acquisition, directly or indirectly, using loyalty points.

Communication between the user and/or merchant and the system of the present invention is accomplished through any suitable communication means, such as, for example, a telephone network, Intranet, Internet, point of interaction device (point of sale device, personal digital assistant, cellular phone, kiosk, etc.), online communications, off-line communications, wireless communications, and/or the like. One skilled in the art may also appreciate that, for security reasons, any databases, systems, or components of the present invention may consist of any combination of databases or components at a single location or at multiple locations, wherein each database or system includes any of various suitable security features, such as firewalls, access codes, encryption, de-encryption, compression, decompression, and/or the like.

Merchant system 120 may include a computer that may provide a suitable website or other Internet-based graphical user interface which is accessible by users. In one embodiment, the Internet Information Server, Microsoft Transaction Server, and Microsoft SQL Server, are used in conjunction with the Microsoft operating system, Microsoft NT web server software, a Microsoft SQL database system, and a Microsoft Commerce Server. Additionally, components such as Access or SQL Server, Oracle, Sybase, Informix MySQL, Intervase, etc., may be used to provide an ADO-compliant database management system. The term "webpage" as it is used herein is not meant to limit the type of documents and applications that might be used to interact with the user. For example, a typical website might include, in addition to standard HTML documents, various forms, Java applets, Javascript, active server pages (ASP), common gateway interface scripts (CGI), extensible markup language (XML), dynamic HTML, cascading style sheets (CSS), helper applications, plug-ins, and/or the like.

It may be appreciated that many applications of the present invention could be formulated. One skilled in the art may appreciate that a network may include any system for exchanging data or transacting business, such as the Internet, an intranet, an extranet, WAN, LAN, satellite communications, and/or the like. It is noted that the network may be implemented as other types of networks, such as an interactive television (ITV) network. The users may interact with the system via any input device such as a keyboard, mouse, kiosk, personal digital assistant, handheld computer (e.g., Palm Pilot®), cellular phone and/or the like. Similarly, the invention could be used in conjunction with any type of personal computer, network computer, workstation, minicomputer, mainframe, or the like running any operating system such as any version of Windows, Windows NT, Windows2000, Windows 98, Windows 95, MacOS, OS/2, BeOS, Linux, UNIX, Solaris or the like. Moreover, although the invention is frequently described herein as being implemented with TCP/IP communications protocols, it may be readily understood that the invention could also be implemented using IPX, Appletalk, IP-6, NetBIOS, OSI or any number of existing or future protocols. Moreover, the system contemplates the use, sale or distribution of any goods, services or information over any network having similar functionality described herein.

The computing units may be connected with each other via a data communication network. The network may be a public network and assumed to be insecure and open to eavesdroppers. In the illustrated implementation, the network may be embodied as the internet. In this context, the computers may or may not be connected to the internet at all times. For instance, the customer computer may employ a modem to occasionally connect to the internet, whereas the bank computing center might maintain a permanent connection to the internet. Specific information related to the protocols, standards, and application software utilized in connection with the Internet may not be discussed herein. For further information regarding such details, see, for example, DILIP NAIK, INTERNET STANDARDS AND PROTOCOLS (1998); JAVA 2 COMPLETE, various authors, (Sybex 1999); DEBORAH RAY AND ERIC RAY, MASTERING HTML 4.0 (1997). LOSHIN, TCP/IP CLEARLY EXPLAINED (1997). All of these texts are hereby incorporated by reference.

The systems may be suitably coupled to the network via data links. A variety of conventional communications media and protocols may be used for data links. For example, a connection to an Internet Service Provider (ISP) over the local loop as is typically used in connection with standard modem communication, cable modem, Dish networks, ISDN, Digital Subscriber Line (DSL), or various wireless communication methods. The merchant system might also reside within a local area network (LAN) which interfaces to network via a leased line (T1, D3, etc.). Such communication methods are well known in the art and are covered in a variety of standard texts. See, e.g., GILBERT HELD, UNDERSTANDING DATA COMMUNICATIONS (1996), hereby incorporated by reference.

Each user may be equipped with a computing system to facilitate online commerce transactions. The user has a computing unit in the form of a personal computer, although other types of computing units may be used including laptops, notebooks, hand held computers, set-top boxes, and/or the like. The merchant has a computing unit implemented in the form of a computer-server, although other implementations are possible. The bank (transaction account) may have a computing center such as a main frame computer. However, the bank computing center may be implemented in other forms, such as a minicomputer, a PC server, a network set of computers, or the like.

Merchant system 120 may be configured to charge a transaction card account for the transaction. Any known or new methods and/or systems for charging the transaction card account may be used. In various exemplary embodiments of the present invention, one or more transaction card accounts may be used to initially pay for an acquisition. The acquisition may be only partially paid for using the transaction card account(s), for example, cash may be paid for part of an acquisition and the transaction card account may be used for the rest of the acquisition.

Furthermore, one or more loyalty accounts may be used to exchange loyalty points as payment for the acquisition. In one embodiment, a single transaction card is fully reimbursed, for the charge associated with the acquisition, by points from a single loyalty account. In another embodiment, the transaction card is reimbursed to the extent that loyalty points are available and the remainder remains charged to the transaction card. In other embodiments, loyalty points from one or more loyalty accounts may be exchanged to credit one or more transaction card accounts. Moreover, the transaction card accounts may only be partially reimbursed or may be reimbursed for more or less than the amount charged (for example, where the purchase is made using more than one card and only one card is credited).

In another embodiment, merchant system 120 is configured to accept loyalty points directly as payment for the acquisition. In this embodiment, the merchant does not charge a transaction card account and the transaction card account is not credited. Instead, merchant system 120 is configured to accept loyalty points and debit the loyalty account. For example, in a loyalty points purchase, the merchant may be paid with loyalty points and the merchant may redeem the loyalty points for monetary value. Such systems for direct payment via loyalty points may be further described herein and/or in the incorporated references, such as, the Loyalty As Currency™ and Loyalty Rewards Systems disclosed in Ser. No. 60/197,296 filed on Apr. 14, 2000, Ser. No. 60/200,492 filed Apr. 28, 2000, Ser. No. 60/201,114 filed May 2, 2000.

In one embodiment, an electronic commerce system may be implemented at the customer/user and issuing bank. For example, the electronic commerce system is implemented as computer software modules loaded onto the customer computer and the banking computing center. In this example, the merchant computer does not require any additional software to participate in the online commerce transactions supported by the online commerce system. The user may select loyalty points as a payment option during an on-line transaction. In one exemplary on-line embodiment, loyalty points may be selected as a payment option by selecting a web object such as a check box, radial button, or pull down menu option. For example, the user may select loyalty points from a pull down menu that also contains other available transaction card options. In an exemplary off-line embodiment, a customer service representative, at the request of the purchaser, may identify (as described in more detail below) the transaction as a loyalty point transaction. In another example, a point-of-sale machine may be configured to allow the input of a code, or an answer to a prompt that causes the purchase to be identified as a loyalty points purchase.

In both on-line and off-line embodiments, identifying or "tagging" the file as a loyalty point transaction may be accomplished by storing the information in one or more files that are logically separated from the other transaction card files, if any. Alternatively, if transactions on various transaction card accounts are stored in the same file, the loyalty point transactions may be identified by any suitable code distinguishing the loyalty point transaction from transactions on the various transaction cards. Thus, in one exemplary embodiment of the present invention, loyalty point transactions may be identified and stored in much the same way that transaction card account transactions are identified and stored. Two separate files may, in one example, be created for a single purchase, where one file contains data for the transaction card account that is initially charged for the purchase, and the other file contains data for the loyalty points account. In these examples, the one or more loyalty point transaction files may be batch transmitted to exchange server 130, as described further herein.

In another exemplary embodiment, merchant system 120 is configured to capture loyalty data. For example, merchant system 120 may include a merchant server 122 configured to capture information relevant to the exchange of loyalty points for the transaction. Loyalty data may comprise the amount paid for acquisition and any suitable identifier capable of identifying the transaction card account(s) to be credited and the loyalty account(s) to be debited. Thus, the identifier may solely comprise a transaction card account identifier (e.g., card number) where the transaction card account is associated with a loyalty account. In another example, the identifier may solely comprise a loyalty account identifier, where the loyalty account is associated with a transaction card account. Alternatively, the identifier may comprise one or more transaction card account identifiers and one or more loyalty account identifiers.

The identifier may comprise an account number, card number, the name of an individual, social security number, personal identification number, and/or the like. The identifier may be encrypted for communication to exchange system 130. Merchant server 122 may be configured to communicate the loyalty data to exchange system 130, for example, in real-time or by using a "batch" process at the end of each day. Any suitable means of delivering the loyalty data to exchange system 130 may be used. In one exemplary embodiment of the present invention, the loyalty data is delivered via internet 124.

A ticketing computer and/or merchant server at the merchant system and the loyalty computer(s) at the exchange system 130 or loyalty accounts system 140 may be interconnected via a second network, referred to as a payment network. The payment network represents existing proprietary networks that presently accommodate transactions for credit cards, debit cards, and/or other types of financial/banking cards. The payment network is a closed network that is assumed to be secure from eavesdroppers. Examples of the payment network include the Loyalty System®, VisaNet® and the Veriphone® network.

In an exemplary embodiment, exchange system 130 is any person, entity, hardware and/or software configured to receive the loyalty data and to decrypt the identifier (if applicable). Exchange system 130 may also be configured to look up (for example, in a database) associated transaction card accounts and/or loyalty accounts associated with the identifier. In accordance with an exemplary embodiment of the present invention, exchange system 130 is further configured to convert the amount paid for the acquisition to loyalty points. For example, the conversion may multiply the dollar amount by 200 or any other suitable multiplier to calculate equivalent loyalty points. Furthermore, in one embodiment, exchange system 130 may be configured to facilitate access to loyalty accounts system 140, to provide loyalty accounts system 140 with the identifier, to verify qualification for exchange of loyalty points, and/or to cause loyalty accounts system 140 to debit the calculated loyalty points. Loyalty accounts system 140 may also be configured to report rejected requests for loyalty point exchange.

Loyalty accounts system 140 is any person, entity, hardware and/or software which may be configured to facilitate receiving the calculated equivalent loyalty points and a loyalty account identifier or other identifier, and/or to report back qualification information to exchange system 130. This qualification information may facilitate the determination of whether a request is a qualifying request for exchange of loyalty points. For example, loyalty accounts system 140 may report back whether a loyalty account exists (whether enrolled), if the account is active, and/or if sufficient loyalty points exist in the account. Loyalty accounts system 140 may also be configured to debit the calculated loyalty points at the direction of exchange system 130. Loyalty accounts system 140 may also be configured to look up (in a database) transaction card accounts associated with the loyalty account. In addition, the debiting of a loyalty account may cause loyalty accounts system 140 to directly cause transaction account system 150 to credit the transaction card account. Optionally, exchange system 130 may cause transaction account system 150 to credit amounts to the transaction card account. Although discussed as a loyalty accounts system, the loyalty accounts system may represent other types of card issuing institutions, such as credit card companies, card sponsoring companies, or third party issuers under contract with financial institutions. It is further noted that other participants may be involved in some phases of the transaction, such as an intermediary settlement institution, but these participants are not shown.

In yet another exemplary embodiment, loyalty account system 140 may be configured to pay the merchant directly for the loyalty point purchases. Furthermore, in this example, the merchant may not charge the transaction card account and loyalty account system 140 may not credit the transaction card account. Loyalty account system 140 may make such payments to the merchant using loyalty points and the merchant may redeem the loyalty points for monetary value or for other rewards. Then, the purchaser's loyalty point account may be debited for an amount representing the transaction price.

In one embodiment, transaction account system 150 is any person, entity, hardware and/or software which is configured to receive input causing the transaction account system to credit the transaction card account. As mentioned above, transaction account system 150 may also be configured to pay and settle with the merchant and/or bill the transaction account owner, the details of which are well-known in the art.

Figure 2:
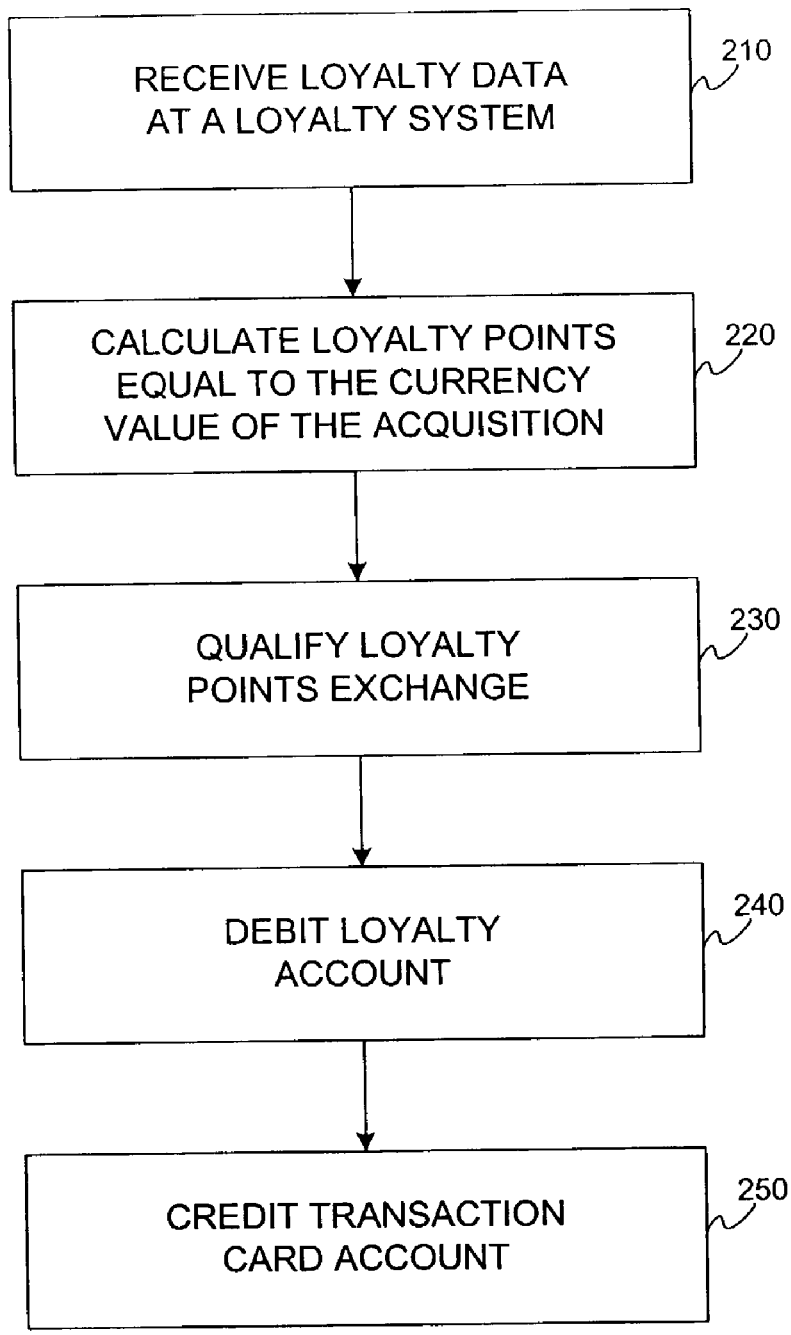
FIG. 2 illustrates a general overview of an exemplary loyalty point exchange method in accordance with an exemplary embodiment of the present invention.

FIG. 2 illustrates a general overview of an exemplary loyalty point exchange method 200 comprising the steps of: receiving loyalty data at loyalty accounts system 140 (step 210), calculating the total loyalty points equal to the currency value of the acquisition (step 220), qualifying the loyalty point exchange (step 230), debiting a loyalty account (step 240), and crediting a transaction card account (step 250). In this manner, a user obtains the benefit of securing the actual "reward" (e.g., tickets), whether or not the purchase qualifies for purchase by loyalty points. User 101 may be responsible for knowing the available point balance and/or be willing to keep the charge on the transaction card account if the loyalty account ultimately does not have the points to cover the charge/credit the charge. Alternatively, user 101 may apply the available loyalty points to pay for a purchase with the rest of the charge remaining on the transaction card account.

In one embodiment, the process may include a user facilitating the input of information into loyalty system 100 (step 210). The information may be inputted via keypad, magnetic stripe, smart card, electronic pointer, touchpad and/or the like, into user computer 102, POS terminal, ATM terminal and/or directly into merchant system 120 via a similar terminal or computer associated with merchant server 122. The information may be transmitted via any network 103 discussed herein to merchant system 120. In another embodiment, the merchant may enter the information into loyalty system 100. This may occur, for example, when the user authorizes the transaction over a telephone and the service representative inputs the information.

The input of information may occur as part of the process for charging the transaction card account for the acquisition. The transaction charge, however, is tagged as a loyalty point exchange transaction. In one embodiment, tagging a transaction may occur by saving the information in a file. In another embodiment, a tag may be a loyalty account number, a flag, or any other suitable identifier. The tag may be associated with the information, for example, as stored in a file. Merchant system 120 may be configured to capture particular information, described herein, from the information input to charge the transaction card account. For example, particular fields of information may be captured from each tagged transaction. In another embodiment, the information may be entered separately from the input of information related to charging the transaction card account.

The captured information may include, for example, the cost or value of the acquisition and an identifier of the accounts involved in the debiting and/or crediting steps. The identifier may comprise a single account number, for example where the transaction and loyalty account numbers are linked to each other and identification of one account is sufficient to identify the associated account. Alternatively, the identifier may include multiple account numbers. For example, in an on-line embodiment, the one or more account identifiers may be entered on a web page for specifying the appropriate loyalty account(s) and/or transaction card account(s). Furthermore, the information or monetary cost may include a transaction fee and/or the like. The total loyalty points may be calculated, for example, by multiplying the monetary cost of the acquisition by a multiplier (step 220). The multiplier may be a constant, such as multiplying by 200 or another number. The total loyalty points may also be calculated using a variable multiplier. For example, the multiplier may change based on the time and date, in accordance with various promotions, and/or to reflect other business objectives. Furthermore, the multiplier may be set at different levels for various membership tiers.

Based on the identifier received in step 210, exchange system 130 may verify the identified loyalty account (i.e., the participant is enrolled in the loyalty program and any other data verification), and determine if the account is active and if sufficient loyalty points exist in the account (step 230). Other verification steps may be used instead of or in addition to the aforementioned verification steps to qualify the transaction for exchange of loyalty points. For example, exchange system 130 may verify that the account is in good standing. In an exemplary embodiment, to qualify, the participant should be enrolled in the loyalty program, have enough loyalty points to cover the entire cost of the transaction, and have an active account. In another embodiment, verification may be made through a transaction card account verification system.

For qualifying participants, loyalty system 100 may debit (step 240) the loyalty points (at a conversion of approximately 200 points per dollar or any other multiplier), and credit the transaction card account for the total receipt of charge amount. In exemplary embodiments, participants may realize the debit/credit (step 250) in real-time, within 48-72 hours of the actual order, or later if the transactions are handled in a batch mode. Orders failing to qualify for loyalty redemption and exchange (e.g., not enough points or not enrolled in the loyalty program) may remain valid transaction card charges and may be subject to a ticketing agency's no refund/no exchange policy.

In accordance with another exemplary embodiment of the present invention, the exchange of loyalty points may be accomplished without a transaction card. For example, merchant system 120 may be configured to accept loyalty points as currency. In this embodiment, for example, user 101 may contact a merchant in either an on-line mode or off-line mode. In an on-line mode, user 101 may use pull down menus, or the like, on a merchant web page to select loyalty points as a direct payment method. In an off-line mode, user 101 may request, for example over the phone, that the purchase be made directly with loyalty points. In either mode, the loyalty point account number is captured and communicated to exchange system 130. Next, the transaction is authorized, for example, by querying loyalty account system 140 to verify that user 101 is enrolled with an account in good standing and with sufficient points for the transaction. Upon receiving authorization, loyalty accounts system 140 debits the user's loyalty account and causes a payment to be made to the merchant. The payment, for example, is made from loyalty accounts system 140 through Automatic Clearing House credit, by check, and/or the like, to the merchant's bank account.

Figure 3A:
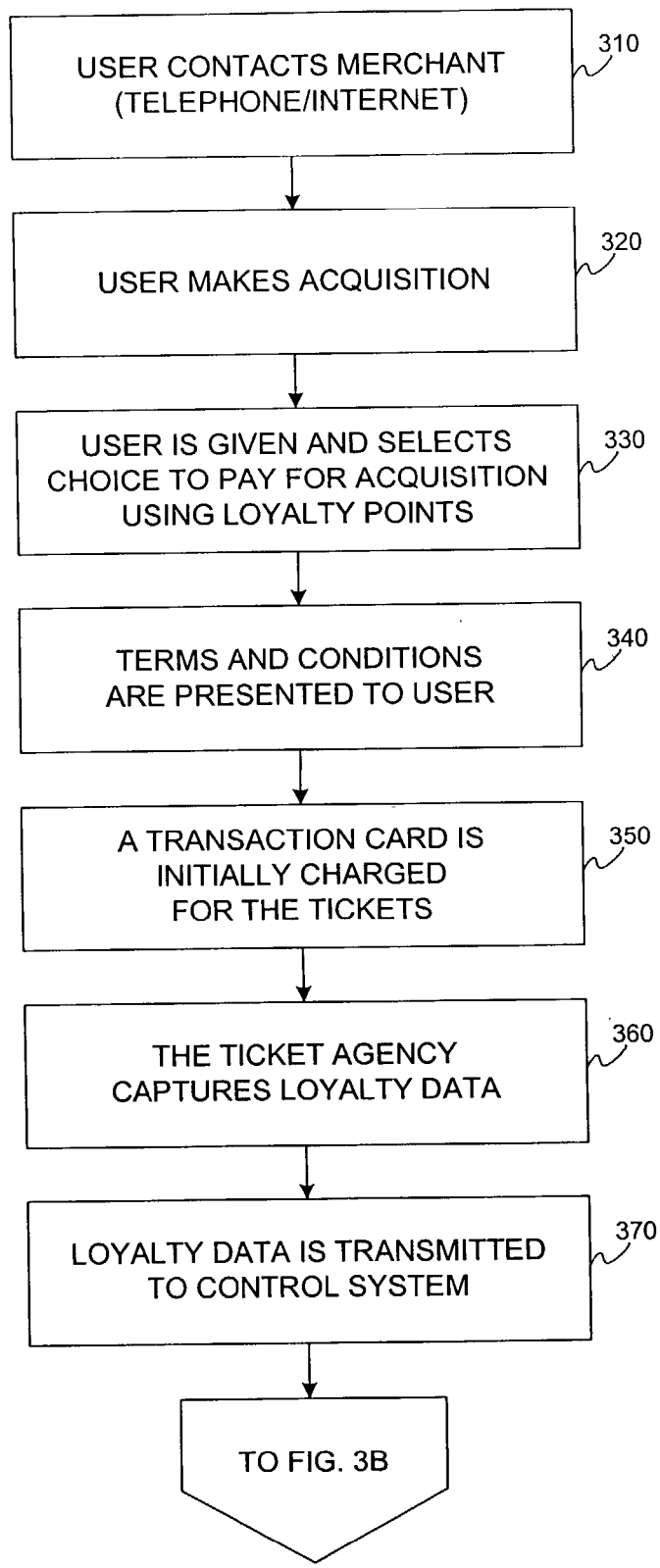
FIGS. 3A & 3B illustrate a more detailed exemplary loyalty point exchange method in accordance with an exemplary embodiment of the present invention.
Figure 3B:
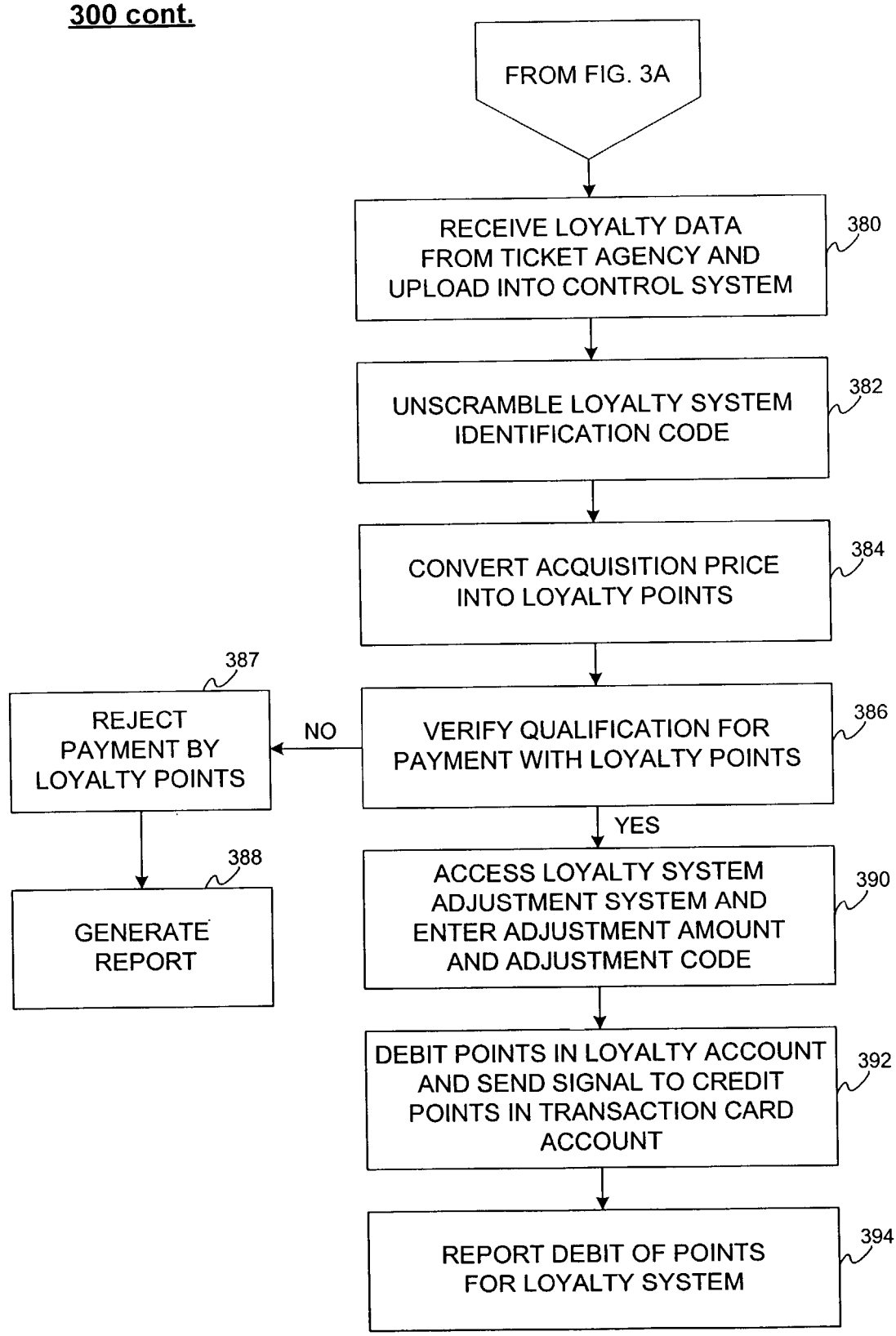

FIGS. 3A and 3B illustrate a more detailed exemplary loyalty point exchange method 300. A user contacts a merchant in person, telephonically, electronically, and/or in like manner (step 310). For example, a user may contact a ticket seller in person by visiting a box office, a ticket outlet, or the like. Furthermore, the user may contact a ticketing agency network by telephone through an interactive voice response (IVR) system or by talking with a service representative.

The user may select goods or services for acquisition (step 320) and initiate payment for the acquisition. At the point of sale, the representatives or IVR system may present to the user the option to use loyalty points to purchase tickets. In one embodiment of the present invention, the user is presented with the option of paying for the acquisition using loyalty points (step 330). In another embodiment, the user may instead ask the merchant to accept payment using loyalty points. The user may respond (step 330) in any appropriate manner to indicate a desire to make payment using loyalty points. For example, the user may press a number on the telephone, select an option from a pull down menu, enter a code on a web page or into a point of service device, or verbally confirm to the service representative the desire to pay using loyalty points. Furthermore, a user may initiate the identification of the transaction as a loyalty point transaction by responding to a prompt on a point-of-sale device, swiping a card, selecting a web object, and/or the like. The user may also be given the option to cancel the transaction or use of loyalty points towards the current purchase.

In some embodiments, the ticketing agency phone prompt system may direct the participant to the appropriate phone representative or automated phone line when the participant requests to use loyalty points to pay for the purchase. For example, the participant may interact with a live phone representative or enter responses on an IVR system. In one example, the participant may provide a transaction card account number, and indicate that the purchase is to be paid for using loyalty points. In another example, the provide a reward code or other identifier to the phone representative. The reward code may identify the transaction as a loyalty payment transaction. Furthermore, the reward code itself may serve as an identifier of the accounts to be debited and credited. This code may be provided to the participant through email, direct mailing campaigns, or any other method. This code may be used in one or more transactions. In these various embodiments, information about the transaction may be recorded in a loyalty points file.

The user may also contact the merchant electronically, for example, via the internet. For online purchases, in one embodiment, the participant visits a ticketing agency website and selects event tickets for purchase. If choosing to use loyalty points to pay for purchases, the participant may input a promotional code identifying the transaction as a loyalty point exchange transaction. In another embodiment, loyalty points are offered as a payment option. For example, the participant may select a transaction card and/or loyalty points as payment methods. This selection may be made from a drop down menu of payment choices, check boxes, radial buttons, and/or the like. In one embodiment, in addition to selecting a transaction card from a pull down menu, the participant can select a check box next to a statement indicating that a particular number of loyalty points may be debited from the participant's account to complete the purchase. The participant may also enter or select the particular amount of loyalty points to use during the transaction.

During the request to pay using loyalty points, the terms and conditions may be presented to the user (step 340). The transaction may initially be charged to a transaction card account (step 350). The charging to a transaction card account may occur using any appropriate method now in use or later developed. For example, a point of sale device may initiate such a charge by swiping a charge card through the card reader. Furthermore, a file may be created containing information, loyalty data, related to the transaction. In other embodiments, the merchant system may tag a stored record by adding an identifier to the transaction or the file to identify the transaction as a loyalty points transaction. The loyalty data may include data such as the price of the transaction and an identifier of the accounts involved in the loyalty point exchange. The loyalty data may be captured (step 360) by storage of the data in a file layout, database, and/or the like. The loyalty data may be stored for later transmission (step 370), partially transmitted or transmitted in real time. In one exemplary embodiment of the present invention, the loyalty data is communicated from the ticketing agency to the exchange system on a nightly basis, as a batch process.

FIG. 3B illustrates a continuation of the exemplary loyalty point exchange method 300 of FIG. 3A. Loyalty data is received from the merchant, e.g., ticket agency (step 380). The loyalty data may contain a scrambled loyalty account identifier and the amount of the event charged. Furthermore, the file containing the loyalty data may be uploaded into exchange system 130 (step 380). If appropriate, a built-in macro may unscramble or decrypt the loyalty account identifier or identifier (step 382). Then, another macro may convert the amount of the transaction to an amount of loyalty points (200 multiplied by the debit amount) and/or an amount of loyalty points for different loyalty programs (step 384).

Exchange system 130 may then verify qualification for payment with loyalty points (step 386). For example, exchange system 130 is configured to receive messages in response to entry of an account number/identifier. If the messages received indicate that loyalty point exchange is not qualified, the exchange request is rejected and, for example, a report is generated (steps 387 and 388). The messages that may result in a rejected request include "Invalid Account Number", "No Loyalty Data Found For The Account Number", "Inactive", or similar messages. Loyalty accounts system 140 may further provide information such as the tier status of the participant, the number of linked cards, number of miles, and/or the like for use by exchange system 130.

Next, exchange system 130 may transmit an adjustment amount and/or adjustment code to loyalty accounts system 140 (step 390). The identified account(s) may be debited (step 392) and a signal may be sent to transaction account system 150 causing that system to credit the transaction card account (s). Next, the debiting of the loyalty account may be reported, for example, by exchange system 130 (step 394). Although various steps may be performed manually, in one embodiment, the process is performed in an automated manner from step 360 through step 394.

Loyalty programs account for a large percentage of participant spending; thus, offering valuable reward opportunities increases loyalty and retention of this important base of participants and reduces the overall redemption costs. Additionally, integrated redemption programs for ticket purchases have the potential to "burn" large amounts of loyalty points at a lower cost to the loyalty system than other types of redemptions. Merchants benefit from new customers in the form of loyalty participants who otherwise would not have purchased from the merchant with money. Merchants may also benefit from incremental spending because consumers may purchase more tickets due to the availability of loyalty points. Also merchants may benefit from joint marketing opportunities. Users of the loyalty point exchange systems and methods may experience the convenience of a one-stop process for using loyalty points for their ticket purchase. Furthermore, loyalty point exchange users have real time loyalty point access for tickets and/or other time sensitive transactions.

The present invention may be described herein in terms of functional block components, optional selections and/or various processing steps. It should be appreciated that such functional blocks may be realized by any number of hardware and/or software components configured to perform the specified functions. For example, the present invention may employ various integrated circuit components, e.g., memory elements, processing elements, logic elements, look-up tables, and/or the like, which may carry out a variety of functions under the control of one or more microprocessors or other control devices. Similarly, the software elements of the present invention may be implemented with any programming or scripting language such as C, C++, Java, COBOL, assembler, PERL, Visual Basic, SQL Stored Procedures, extensible markup language (XML), with the various algorithms being implemented with any combination of data structures, objects, processes, routines or other programming elements. Further, it should be noted that the present invention may employ any number of conventional techniques for data transmission, signaling, data processing, network control, and/or the like. Still further, the invention could be used to detect or prevent security issues with a client-side scripting language, such as JavaScript, VBScript or the like. For a basic introduction of cryptography and network security, the following may be helpful references: (1) "Applied Cryptography: Protocols, Algorithms, And Source Code In C," by Bruce Schneier, published by John Wiley & Sons (second edition, 1996); (2) "Java Cryptography" by Jonathan Knudson, published by O'Reilly & Associates (1998); (3) "Cryptography & Network Security: Principles & Practice" by Mayiam Stalling, published by Prentice Hall; all of which are hereby incorporated by reference.

It should be appreciated that the particular implementations shown and described herein are illustrative of the invention and its best mode and are not intended to otherwise limit the scope of the present invention in any way. Indeed, for the sake of brevity, conventional data networking, application development and other functional aspects of the systems (and components of the individual operating components of the systems) may not be described in detail herein. It should be noted that many alternative or additional functional relationships or physical connections may be present in a practical loyalty point exchange system.

As may be appreciated by one of ordinary skill in the art, the present invention may be embodied as a method, a data processing system, a device for data processing, and/or a computer program product. Accordingly, the present invention may take the form of an entirely software embodiment, an entirely hardware embodiment, or an embodiment combining aspects of both software and hardware. Furthermore, the present invention may take the form of a computer program product on a computer-readable storage medium having computer-readable program code means embodied in the storage medium. Any suitable computer-readable storage medium may be utilized, including hard disks, CD-ROM, optical storage devices, magnetic storage devices, and/or the like.

These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flowchart block or blocks.

In the foregoing specification, the invention has been described with reference to specific embodiments. However, it may be appreciated that various modifications and changes can be made without departing from the scope of the present invention. The specification and figures are to be regarded in an illustrative manner, rather than a restrictive one, and all such modifications are intended to be included within the scope of present invention. Accordingly, the scope of the invention should be determined by the appended claims and their legal equivalents, rather than by the examples given above. For example, the steps recited in any of the method or process claims may be executed in any order and are not limited to the order presented.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as critical, required, or essential features or elements of any or all the claims. As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus. Further, no element described herein is required for the practice of the invention unless expressly described as "essential" or "critical".

What is claimed is:

1. A computer implemented method for facilitating acquisitions from a merchant, wherein payment for an acquisition is made using at least one transaction card account which is to be at least partially reimbursed using loyalty points from at least one loyalty account, the method comprising the automated steps of:
   receiving account data at a merchant computer related to the at least one transaction card account from a user;
   receiving information at an exchange system computer from the merchant computer via a network relating to the acquisition, wherein the information comprises the account data and loyalty data, and wherein the loyalty data indicates that the acquisition was at least partially paid for using the at least one transaction card account that is to be at least partially reimbursed using loyalty points from the at least one loyalty account;
   authenticating the information;
   debiting the at least one transaction card account, in a transaction account system connected to the exchange system by a network, by an amount to be paid for using the at least one transaction card account;
   debiting the at least one loyalty account, in a loyalty account system connected to the exchange system by a network, for the acquisition, based on loyalty data corresponding to the acquisition, by an amount of loyalty points equivalent to a currency value of a reimbursement amount that is at least a portion of a total amount of the acquisition; and
   crediting the at least one transaction card account by the reimbursement amount for the acquisition.

2. The computer implemented method of claim 1 wherein the acquisition is a purchase of an event ticket and wherein the merchant is a ticket agent.

3. The computer implemented method of claim 2 wherein the event ticket is purchased from an exchange.

4. The computer implemented method of claim 3 wherein the information in said step of receiving information further comprises an identifier of a purchase price of the event ticket, an identifier of each transaction card being used, and an identifier of each loyalty account being used.

5. The computer implemented method of claim 1 wherein the at least one loyalty account is associated with the at least one transaction card account.

6. The computer implemented method of claim 1 wherein each transaction card account being used is associated with at least one of: a credit card, debit card, smart card, stored value card, and a digital wallet.

7. The method of claim 1 wherein the exchange system is configured to reject non-qualifying requests for payment using loyalty points.

8. The method of claim 1 wherein a plurality of loyalty accounts are debited for the acquisition.

* * * * *